Sept. 11, 1962 W. BADER ET AL 3,052,952
TOOLHOLDER
Filed Nov. 14, 1960 2 Sheets-Sheet 1
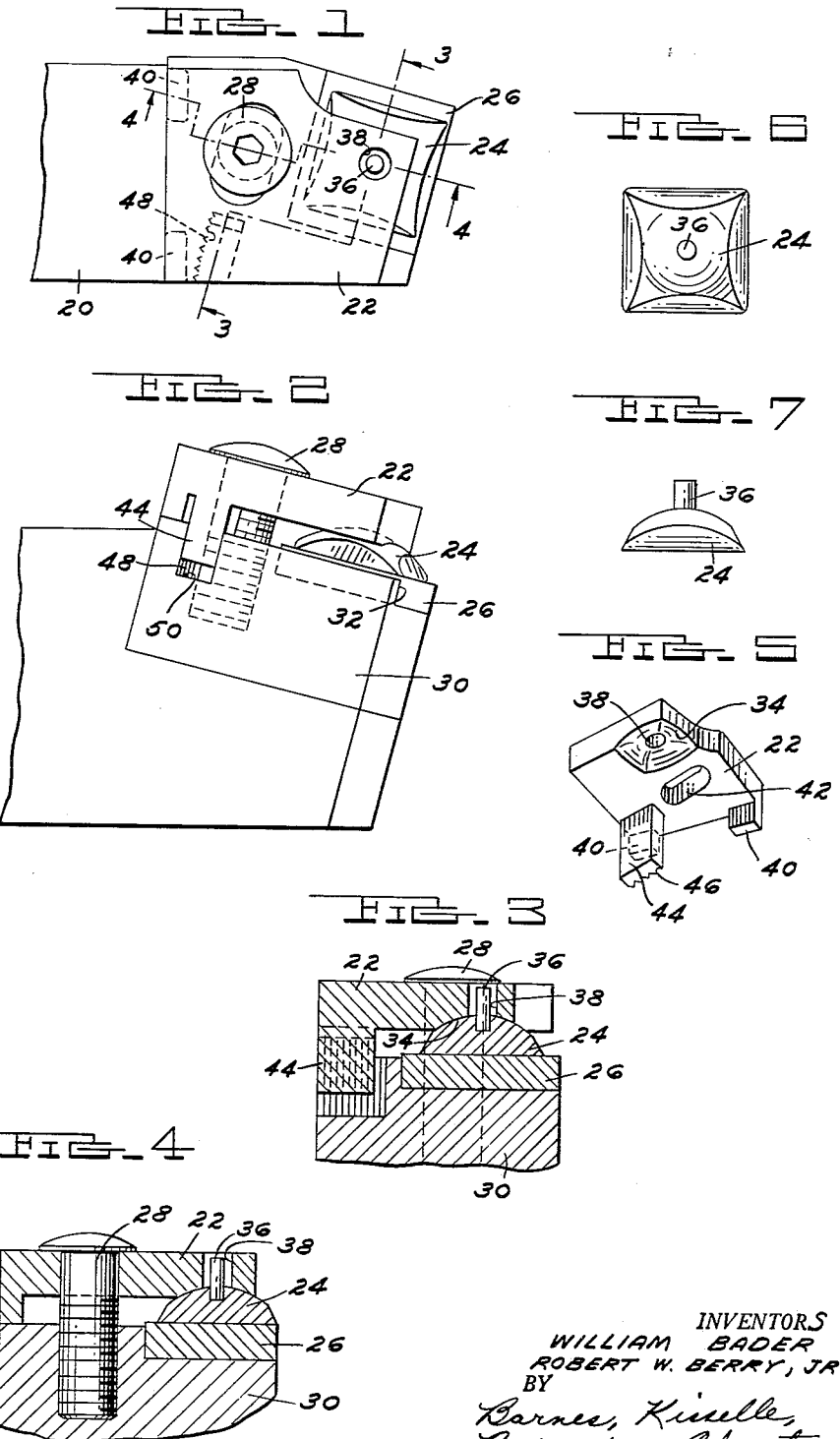
INVENTORS
WILLIAM BADER
ROBERT W. BERRY, JR.
BY
Barnes, Kisselle,
Raisch & Choate
ATTORNEYS Sept. 11, 1962 W. BADER ET AL 3,052,952
TOOLHOLDER
Filed Nov. 14, 1960 2 Sheets-Sheet 2
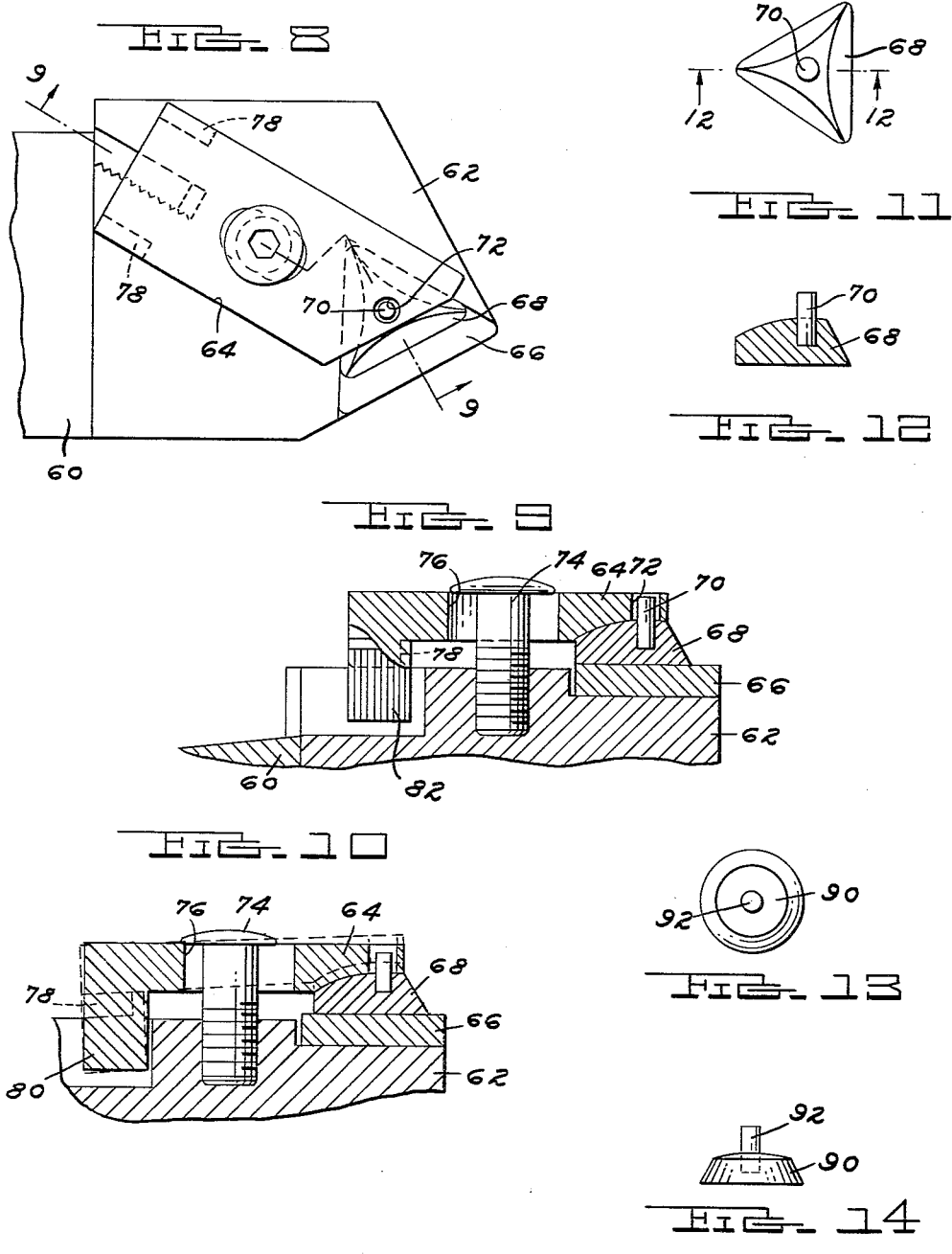
INVENTORS
WILLIAM BADER
ROBERT W. BERRY, JR.
BY
Barnes, Kisselle, Raisch & Choate
ATTORNEYS 3,052,952
TOOLHOLDER
William Bader and Robert W. Berry, Jr., Ferndale, Mich., assignors, by mesne assignments, to Wesson Corporation, Ferndale, Mich., a corporation of Delaware
Filed Nov. 14, 1960, Ser. No. 69,026
2 Claims. (Cl. 29—96)

This invention relates to a toolholder, particularly that type of holder which is used for a single-point tool and for holding a carbide throwaway insert.

Since the development of cutters for throwaway negative inserts in 1949, as illustrated in the Begle-Gaudreau Patent 2,690,610, there has been a trend toward the use of these throwaway pellet-type inserts in single-point tools to replace the fully negative slug type of tungsten carbide insert commonly on the market in that period.

In this connection a number of holders have been developed utilizing anvils and chip breakers in combination with a top clamp. One of the first of this development is illustrated in the Wilson patent, filed April 21, 1953 and maturing into Patent No. 2,883,737. This patent shows a hard metal anvil, a prismatic insert above the anvil and a loose chip breaker on top of the insert held in place by a top clamp.

A similar construction is also shown in the Friedline Patent, No. 2,848,789, issued August 26, 1958.

It is an object of the present invention to provide an improved holder for prismatic tungsten carbide inserts with a novel clamping device for the inserts including a loose and indexable chip breaker and means on the clamp for permitting adjustment of the chip breaker relative to the edge of the cutting insert.

Another object of the invention is the provision of a clamp which in a sense is independent of the thickness of the carbide insert which may vary in manufacturing tolerance or by reason of being ground.

Other objects and features of the invention relating to the operation will be apparent in the following description and claims.

Drawings accompany the disclosure and the various views thereof may be briefly described as:

FIGURE 1, a top view of an assembled unit made according to the present invention.
FIGURE 2, a side elevation.
FIGURE 3, a sectional view on line 3—3 of FIG. 1.
FIGURE 4, a sectional view on line 4—4 of FIG. 1.
FIGURE 5, a perspective view of the clamp taken from the bottom.
FIGURE 6, a top of the indexable carbide chip breaker.
FIGURE 7, a side elevation of the chip breaker.
FIGURE 8, a top view of a modified device as used for triangular inserts.
FIGURE 9, a sectional view on line 9—9 of FIG. 8.
FIGURE 10, a side elevation of the device of FIG. 8 illustrating the manner in which the angle can be altered.
FIGURE 11, a plan view of the chip breaker.
FIGURE 12, a sectional view of the chip breaker on line 12—12 of FIGURE 1.
FIGURE 13, a plan view of a circular chip breaker.
FIGURE 14, a side elevation of the circular chip breaker.

Referring to the drawings:

In FIGURE 1 a tool body shank 20 is shown with a top clamp 22, a chip breaker 24 and an insert 26, the parts being held together by a cap screw 28. The entire assembly is mounted on an anvil block 30 suitably screwed to the shank 20 by a screw (not shown) such as described in our co-pending application, Serial No. 746,882, filed July 7, 1958.

It will be seen from the drawings that the block 30 has a suitable recess 32 for the insert 26. The insert 26 is a standard tungsten carbide prismatic insert or possibly a ceramic insert.

The clamping plate 22 has a spherical recess 34 on the bottom front surface to receive the spherical top of the indexable chip breaker insert 24 which is preferably formed of tungsten carbide or an equivalent hard material. The insert 24 has a pin 36 extending up into a hole 38 to permit lifting of the clamp without dislodgment of the chip breaker. The clamp 22 also has two heel lugs 40 and an elongate slot 42 for receiving the shank of the bolt 28.

It is desirable that the clamp 22 be shiftable toward and away from the edge of the insert 26 to permit the chip breaker to assume different relative positions relative to the cutting edge of the insert. This motion is controlled by a depending serrated lug 44 having serrations 46 which cooperate with serrations 48 in a recess 50 of the anvil 30.

It will be seen that when the screw 28 is loosened, the insert 26 may be indexed in its recess 32 and also if desired, the clamp 22 can be loosened to the point that the chip breaker 24 can be indexed. If it is desirable that the chip breaker be shifted relative to the edge of the insert, the screw may be loosened to the point that the clamp may be lifted out of the recess 50 so that the lug 44 can be shifted to another group of serrations in the recess. The pin 36 has a sufficiently loose fit in the hole 38 that the clamp 22 may be higher or lower in its position relative to the tool without affecting the flat contact of the bottom of the chip breaker on the insert 26.

In FIGURE 8, a somewhat modified structure is shown with a tool shank 60 having an anvil plate 62 and a clamp 64, an insert 66 and a chip breaker 68, the insert and the chip breaker being of triangular configuration. A pin 70 on the chip breaker locates it in a hole 72. The assembly is held in place by a headed bolt 74 acting in an elongate slot 76.

Heel studs 78 serve to locate the back end of the clamp 64 on the top of the anvil 62 and a locating lug 80 having serrations 82 serves to locate the clamp 64 relative to the front cutting edge of the insert 66, the assembly being adjustable in the same manner as the structure previously described. The device could also be used for round inserts 90 with a pin 92 as illustrated in FIGURES 13 and 14.

As shown in FIGURE 10 in the event the insert 66 was of greater thickness, the plate 64 could be rocked upwardly without affecting the relationship of the parts. The serrations on the lug 80 are made with sufficient tolerance that this rocking motion can take place without affecting the forward positioning.

We claim:
1. In a toolholder for disposable prismatic cutting inserts such as tungsten carbide and the like, a body means having a recess with an open top and open side walls for receiving a cutting insert to be disposed in the recess with exposed cutting edges and a composite holding clamp and chip breaker comprising a clamping plate mounted on the body and extending over said recess, a spherical undersurface on said clamping plate overlying said recess, an indexable chip breaker comprising a pellet of hard material having a spherical upper surface and a flat undersurface for contact with the upper surface of an insert in the recess, and means for positioning the end of said clamping plate opposite said recess overlying said body comprising contact means at the back of said plate and a serrated depending locator stud cooperating with a serrated wall of a recess in said body, said serrations being disposed in the direction of the cutting forces on the tool wherein the clamping plate may be adjusted forwardly and rearwardly relative to said recess, said chip breaker ele- ment being indexable relative to said recess and said plate to permit the exposure of unused sides thereof.

2. In a toolholder for disposable prismatic cutting inserts such as tungsten carbide and the like, a body means having a recess with an open top and open side walls for receiving a cutting insert to be disposed in the recess with exposed cutting edges and a composite holding clamp and chip breaker comprising a clamping plate mounted on the body and extending over said recess, a spherical undersurface on said clamping plate overlying said recess, an indexable chip breaker comprising a pellet of hard material having a spherical upper surface and a flat undersurface for contact with the upper surface of an insert in the recess, and means for positioning the end of said clamping plate opposite said recess overlying said body comprising heel studs on the back corners of said plate and a serrated depending locator stud cooperating with a serrated wall of a recess in said body, said serrations being disposed in the direction of the cutting forces on the tool wherein the clamping plate may be adjusted forwardly and rearwardly relative to said recess, said chip breaker element being indexable relative to said recess and said plate to permit the exposure of unused sides thereof.

References Cited in the file of this patent

UNITED STATES PATENTS

| | | |
|---|---|---|
| 2,791,824 | Greenleaf | May 14, 1957 |
| 2,897,580 | Huber | Aug. 4, 1959 |